United States Patent [19]
Nash et al.

[11] Patent Number: 5,566,335
[45] Date of Patent: Oct. 15, 1996

[54] METHOD AND APPARATUS FOR FIRMWARE UPGRADES IN EMBEDDED SYSTEMS

[75] Inventors: Mark Nash, Lyons; Mark Jedrzejewski, Ft. Collins, both of Colo.

[73] Assignee: Hewlett-Packard Company, Palo Alto, Calif.

[21] Appl. No.: 31,733

[22] Filed: Mar. 16, 1993

[51] Int. Cl.$^6$ .............................. G06F 9/00; G06F 9/24
[52] U.S. Cl. ................................ 395/700; 364/DIG. 1; 364/280; 364/280.2
[58] Field of Search ...................... 395/700, 650

[56] References Cited

U.S. PATENT DOCUMENTS

| | | | |
|---|---|---|---|
| 4,663,707 | 5/1987 | Dawson | 395/700 |
| 5,093,915 | 3/1992 | Platteter et al. | 395/700 |
| 5,220,667 | 6/1993 | Ichieda | 395/700 |
| 5,269,022 | 12/1993 | Shinjo et al. | 395/700 |
| 5,274,816 | 12/1993 | Oka | 395/700 |
| 5,325,529 | 6/1994 | Brown et al. | 395/700 |
| 5,325,532 | 6/1994 | Crosswy et al. | 395/700 |
| 5,381,549 | 1/1995 | Tamura | 395/700 |

*Primary Examiner*—Kevin A. Kriess
*Attorney, Agent, or Firm*—Edward L. Miller

[57] ABSTRACT

Firmware updates for embedded systems are accomplished by using PROM in favor of conventional ROM, dividing the PROM into pages zero, one, two, etc., that can each contain an entire version of the embedded system. Pages of PROM are addressable by MSB address bits that originate from a circuit that selects page zero upon power-up, and that is responsive to a command in the firmware of the embedded system to increment the value of the MSB address bits. Upon initial fabrication, a product containing the embedded system has entirely unprogrammed PROM. An initial embedded system is zapped into page zero when the product is tested after being turned on for the first time. Replacement versions can be zapped into successive pages as the need arises. Each version includes an initialization routine and its own Get Next Page (GNP) bit. If a version is superseded by another, the old version indicates this by a GNP bit that gets programmed on the old page at the same time the replacement version is zapped into the new page. When that GNP bit is checked by its initialization routine the page selecting MSB address bits are incremented and the micro-processor executing the embedded system is reset; it now runs the initialization routine of the replacement version on the next page, which if not itself replaced, eventually branches out of the initialization routine to the main code of the replacement embedded system.

9 Claims, 1 Drawing Sheet

METHOD AND APPARATUS FOR FIRMWARE UPGRADES IN EMBEDDED SYSTEMS

BACKGROUND AND SUMMARY OF THE INVENTION

Consider the problem of installing updated firmware (i.e., the latest revision) in an embedded control system. Such a control system might, for example, implement the hardware command set of a computer peripheral, such as a back-up tape drive. One such control system is of interest herein; it executes on a commercial micro-controller and occupies 16 Kbytes of address space.

The obvious act of simply replacing a ROM with one having code of a later vintage (or of replacing an entire set of ROM's with another set) may not be the best solution in many circumstances. Sockets are expensive, and are often the source of reliability problems. The removal of through-hole ROM's that have been soldered into place can be time consuming and difficult. If surface mount packaging is in use then specialized equipment is needed to replace the parts. And even with an experienced person doing the desoldering, there is always the chance that the whole board could be ruined accidentally. If actual foundry programmed-at-the-mask-level ROM's are used there is the issue of the lead time required to obtain the newer version of the parts. Finally, there is the cost of inventory. A replacement version put into service may need to be distributed to various locations. This increases the number of unused parts rendered obsolete when a revision is necessary, as well as consuming extra new parts used to "fill the pipeline". This issue of waste can be addressed by using PROM's that are "zapped" only as needed, but that does not, by itself, solve the problem of mechanical replacement.

These disadvantages may be avoided by using a PROM that has two (or some other integer number) times the addresses space required for storing the code that is the control system. For our purposes the term "address space required" is always the actual space used rounded up to the next integer power of 2. For example, a system that actually only uses 12K is treated as if it were 16K, so that the larger address spaces of interest are 32K, 64K, and so on. The multiples of the actual 12K are inconvenient, since their boundaries do not coincide with the addressing effects of additional most significant bits of addressing. For convenience, we shall designate each instance of the required address space with the term "page". The natural sequence of individual pages in the total overall address space is denoted by page numbers 0, 1, 2, . . . .

In a preferred embodiment to be described herein page zero contains an initial version of the control system which is, or which at some future time may become, susceptible to replacement by a replacement version. The initial version will already have been loaded into page zero at some time in the past. Without removing the PROM from the board to which it is attached, the replacement version is permanently loaded (zapped) into page one, after which the initial version is ignored in favor of the replacement version. A second replacement version could be loaded at a still later time into page two, after which time the versions on pages zero and one would be ignored in favor of the version on page two.

This automatic page selection is accomplished by including in each version of the control system a short section of next-page-detection code and a get next page flag that cooperate with a small page selection circuit separate from the micro-controller which executes the code of the control system. Upon the application of power the page selection circuit selects page zero and the micro-controller begins execution of the initial version. The next-page-detection code is reached very early on, and upon discovery of the existence of a non-blank next page (as indicated by the get next page flag) sends an instruction to the page selection circuit to increment the selection mechanism. A reset for the micro-controller is also generated. The process begins again, as if this next page were itself the initial page. If no further pages have been loaded execution continues upon the present page, and the desired version of the control system is executed. If there is another page, however, the increment and reset process is repeated until the last non-blank page is found. The presence of a next page can be indicated in the present page itself by the programming of a reserved bit in the (old) present page called the GNP flag (Get Next Page flag). The GNP flag on page N-1 is programmed at the same time that the replacement page (page N) is programmed.

DESCRIPTION OF A PREFERRED EMBODIMENT

Figure 1:
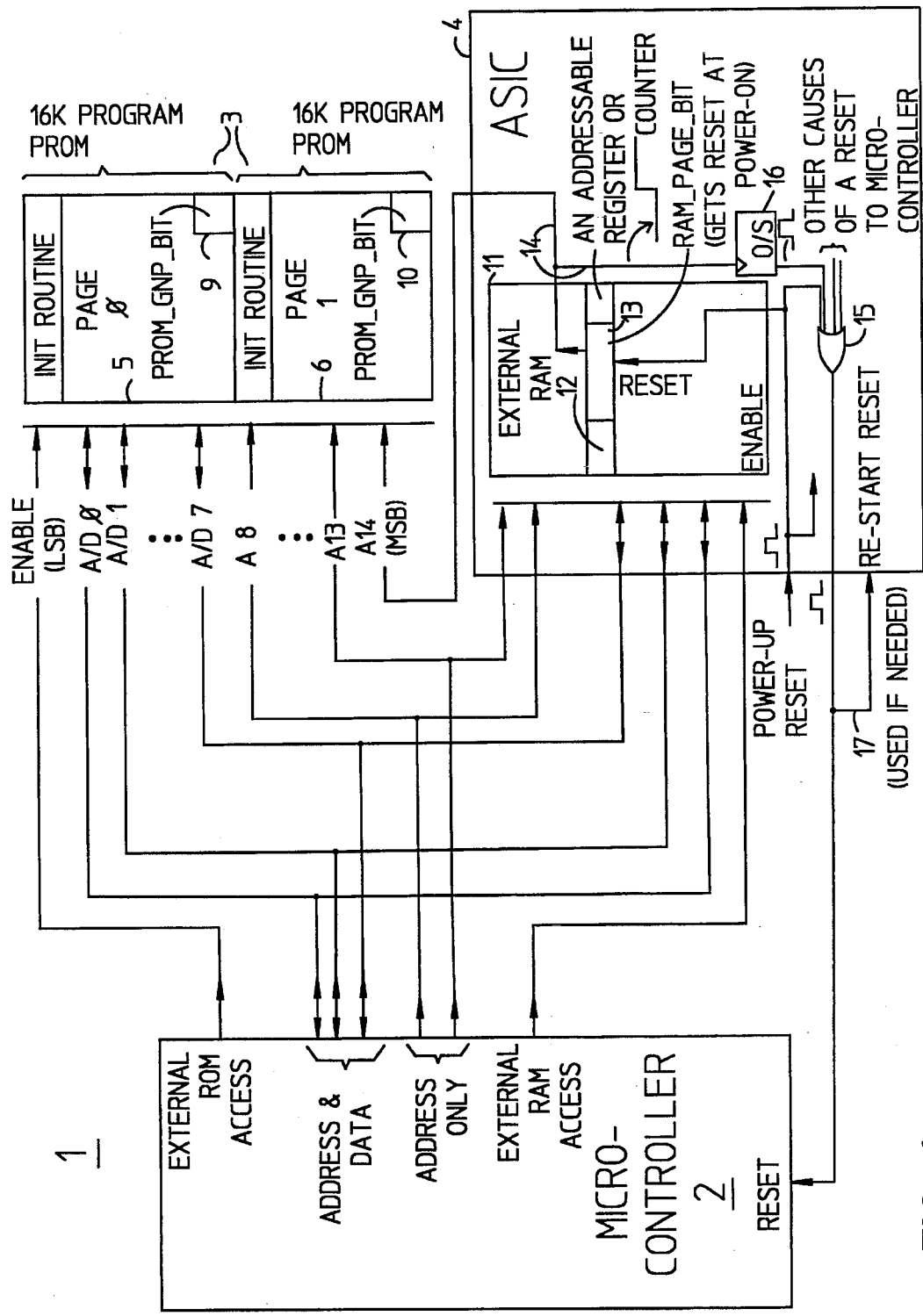
FIG. 1 is a simplified block diagram of an PROM-based embedded system constructed in accordance with the principles of the invention, such that a replacement version of the embedded system subsequently located in a page one of PROM will automatically be executed in place of an initial version originally loaded into and executed from a page zero of PROM.

Refer now to FIG. 1, wherein is shown a simplified block diagram 1 of a circuit and firmware arrangement for automatically selecting from among a plurality of different versions of firmware which version to execute. As shown in the figure, a micro-controller 2 is coupled to a program PROM (Programmable Read Only Memory) 3 and to an ASIC (Application Specific Integrated Circuit) 4. The PROM 3 contains code to be executed by the micro-controller 2, and the ASIC 4 includes circuitry that couples the execution of that code to events and conditions that are part of a larger environment containing the notion of "versions".

In the description that follows there will be many occasions to refer to the value of flags or other quantities that are stored in the PROM 3. There is a potential for confusion arising from the fact that it appears that most PROM's produce machine readable ones for bits that have never been programmed. Bits can only be programmed once, and after they have been programmed they produce machine readable zeros. There is a natural tendency to assume that if a location's value represents a flag, and that if after turn-on nothing has been done to that location, the logical value of the flag ought to be "CLEAR" or zero. Alas, because of the way the PROM's work, the assumption is wrong if the machine readable values are taken as electrically or physically identical to the logical values. We shall do our best to avoid stimulating this confusion: first by making the reader aware of its potential, and second, by referring to the flags as being "programmed" or "unprogrammed". With a "logical" purpose in mind, we shall equate "programmed" with "SET" and "unprogrammed" with "CLEAR". The corresponding machine readable values will likely be "zero" and "one", respectively, although that may (someday) depend upon the vendor of the PROM. By avoiding relying upon or emphasizing the resulting machine readable values we hope to fix it so that it won't matter or become a source of temporary confusion.

The circuit and firmware arrangement 1 is part of an embedded system for a tape drive that is used as a computer peripheral. For that sake of brevity, the interface between the micro-controller 2 and the various elements within the tape drive have been omitted. It will be thoroughly appreciated by those familiar with embedded systems that any of a variety of well known techniques (e.g., memory mapped I/O) can be used to allow a program executing on the controller 2 to measure parameters, determine the status of conditions of interest, activate and de-activate mechanisms, to issue commands within its own system, and to communicate with other systems.

In the arrangement depicted in FIG. 1 the PROM 3 is divided into two pages (5, 6) of 16 Kbytes each. (It will, of course, be appreciated that the particular size of 16 Kbytes is contingent upon the size of the embedded system; it could be 4K, 8K or 32K, etc.) These two pages are termed page zero 5 and page one 6. Page zero 5 is an original, initial, or at least earlier, version of firmware to be executed by the micro-controller 2. If no revisions are desired or have yet occurred, page one 6 will exist (in the sense that there is an address space for it, and that contained therein is some bit pattern, even if it is meaningless). But under those conditions page one 6 is considered to be undefined, logically blank, or to be inexecutable random bits.

What is of interest is how the micro-controller 2, in conjunction with code in the two pages zero and one (5, 6) can decide upon turn-on if a replacement version of code has been loaded into page one 6; in which case it is that replacement version that is to be executed in favor of the earlier version in page zero 5. It is to be noted and appreciated that the code for the actual embedded system portions (as opposed to the page selection portions of the code) of the two pages are completely independent. That is, the properties and features of the two embedded systems could be completely different from one another, and neither relies in the slightest on the other. There now follows a brief discussion of the basic idea used to achieve this, which is then followed by a more detailed examination of how the basic idea was put to use with a specific micro-controller.

A certain number of bits, say n-many, is needed to define the address space occupied by page zero 5 of the PROM. These bits are called the LSB's (Least Significant Bits). One added bit will double the number of addressable locations, and provide the additional space for page one 6. The added address bit is a Most Significant Bit, or MSB. If the MSB is zero, then page zero 5 is addressed by the other bits, while if it is a one then page one 6 will be addressed. All address bits except the MSB originate as usual from the micro-controller 2; the MSB originates from a flip-flop or register cell 13 in an external circuit (ASIC 4). At power-up the origin of the MSB is forced to zero, thus selecting page zero 5 of the PROM. Power-on also resets the micro-controller, which then begins to execute code from a particular and known-in-advance location. The code located at that location is an initialization routine 7.

Included among the activities of the initialization routine 7 is a check of a (normally unprogrammed) PROM Get Next Page bit (PROM_GNP_BIT) 9 on page zero 5 whose meaning is whether or not page zero has been superseded by another page. If it has not, the initialization routine 7 continues a normal initialization, followed by commencing execution of the main system (as implemented by the code of page zero 5). However, if PROM_GNP_BIT 9 has been programmed (done at the same time page one 6 was programmed) the initialization routine 7 sets the MSB flip-flop or register cell 13 to one. This directs all subsequent addressing to page one 6 of the PROM. The setting of the MSB to one also causes a reset to be applied to the micro-controller 2, which then begins an initialization routine 8 located in page one 6 of the PROM. This initialization routine 8 checks another PROM_GNP_BIT 10 on page one 6 (which, in a two page system had better indicate that there is NO next page). Upon discovery that there is no next page the initialization routine 8 completes any remaining initialization process pertaining to the rest of the system, and enters the main code segment (e.g., an idle loop responsive to hardware commands transmitted to the peripheral device incorporating the embedded system).

We turn now to a more detailed examination of the operation of the invention, as implemented in a particular instance where the embedded control system implements a hardware command set for a peripheral tape drive intended for backing up small computer systems. Specifically, the simplified block diagram 1 of FIG. 1 is illustrative of the embedded system employed in the Model DJ-20C Tape Drive available from Colorado Memory Systems of Loveland, Colo.

In FIG. 1 the micro-controller 2 may be an 8032 from the Intel Corp. That particular micro-controller addresses memory with sixteen bits and reads and writes eight bits of data. In the implementation shown in FIG. 1 fourteen bits of addressing are used, while the top two addressing bits from the 8032 are left unused. A combined address and data path has the eight least significant address bits sharing the same lines as the eight bits of data. This sharing is possible in this system because addresses and data are required to occur at separate non-overlapping times. In FIG. 1 these eight shared lines are denoted as A/D0 through A/D7. The remaining address only lines are denoted as A8 through A13. These address and data lines A/D0 through A13 are coupled to a PROM 3 of two 16K pages (page zero 5, page one 6) and to a RAM 11. PROM 3 may be constructed of 272560TP's available from the AMTEL Co.

Other micro-controller signals of interest include EXTERNAL ROM ACCESS and EXTERNAL RAM ACCESS. These signals control which of PROM 3 and RAM 11 responds to a memory cycle. In the particular circuit 1 under consideration RAM 11 is part of an ASIC 4 which contains much other circuitry related to other functions accomplished by the embedded system. It will be appreciated that it is not necessary that RAM 11 and its associated components that cooperate with the invention be part of an ASIC; they could as easily be separate components.

Page zero 5 of PROM 3 and page one 6 of PROM 3 each have 16K of address space, for a total of 32K. An address space of 32K requires fifteen bits of addressing, but only fourteen bits (A/D0–A13) are available from the micro-controller 2. The fifteenth bit A14 originates from a cell 13 in an addressable register 12 that is accessible as part of the address space of RAM 11. As the MSB, A14 selects which of page zero 5 and page one 6 responds to a memory cycle directed to the PROM 3; bits A/D0–A13 address the intended location within that selected page.

A signal POWER-UP RESET is briefly active just after the application of power, and causes the cell 13 to produce a value for MSB A14 that selects page zero 5. An OR gate 15 also receives POWER-UP RESET as an input, and produces an output that is coupled to the Reset input of the Micro-Controller 2. Thus, a consequence of POWER-UP RESET at turn-on is that Micro-Controller 2 begins execution by executing the initialization routine 7 that is part of page zero 5.

Early on in the initialization routine 7 is a portion of object code for which the following pseudo-code is descriptive:

```
PROCEDURE SELECT_PAGE
    BEGIN
        IF RAM_PAGE_BIT = SET {already on page one?}
            THEN ... <INITIALIZE TO COMPLETION
            AND RUN>
        ELSE
        IF PROM_GNP_BIT = CLEAR {on page zero, but
        is there no page one?}
            THEN ... <INITIALIZE TO COMPLETION
            AND RUN>
        ELSE
        RAM_PAGE_BIT := SET {selects page one,
        resets micro-controller}
    END
```

The above section of pseudo-code is specific to a two-page implementation, as is the particular implementation shown in FIG. 1. Minor modifications are needed when three or more pages are to be possible. These modifications are discussed at the end of the Specification.

The same pseudo-code may be used in the initialization routine of each page 5, 6. However, the PROM's themselves need not be programmed ahead of time. Page one won't be programmed, as it is to be left blank until it is needed. Page zero could be programmed ahead of time, but need not be, as that risks wasting parts in the event a revision occurs. Instead, unprogrammed PROM's are soldered into place and programmed as needed, and in situ, by a PROM programmer having suitable clip for connection to the pins of the PROM and coupled to the PROM programmer by a cable.

Page one 6 of PROM 3 will be programmed in the same fashion when it is determined that a new version of the embedded system is to supplant the existing one. This might happen, for example, as an upgrade performed when an older unit is returned for service. The PROM programmer (not shown) is attached to the PROM 3 and the latest version (or whatever version is appropriate for the particular hardware generation at hand) of the embedded system is "zapped" into page one 6. It is at this time also that the PROM_GNP_BIT 9 in page zero 5 is set. It is, as explained, the setting of PROM_GNP_BIT 9 that causes the initialization routine 7 to begin the process of switching pages.

In the two page implementation depicted in FIG. 1 a page switch commences when the initialization routine 7 sets RAM_PAGE_BIT 13 in RAM 11. RAM_PAGE_BIT 13 is simply a cell in an addressable register 12, and setting RAM_PAGE_BIT 13 can be as simple as writing a one to it. Now, the fact that RAM_PAGE_BIT 13 is a one is not as significant for our purpose as the fact that it has just changed from a zero to a one. After all, it could well remain a one throughout the execution of the replacement version of the embedded system on page one; it is the change to being a one that signifies that execution of the new system is to begin. To this end, ASIC 4 includes a one-shot 16 whose input is edge triggered by the zero-to-one transition in the value of RAM_PAGE_BIT 13. The output of the one-shot 16 is coupled as an input to OR gate 15. When OR gate 15 produces an output the micro-controller 2 undergoes a reset.

After its reset micro-controller 2 begins fetching instructions from that address which it expects is the entry point for the code of the embedded system. By now, however, RAM_PAGE_BIT 13 is supplying a set MSB 14 to PROM 3, so that the initialization routine 8 on page one 6 is where micro-controller 2 begins execution. Thus is it that the replacement version of the embedded system is executed in place of the original version.

It will be appreciated that the reason for issuing a reset to the micro-controller 2 is not only to cause it to commence again at the start address for the initialization routine, but also to ensure that all initial internal conditions that may affect events are also set to their normal starting values. In addition to a reset of the micro-controller 2, it may also be desirable to apply a limited "RESTART RESET" signal 17 to the ASIC 4. This signal causes the ASIC to assume its initial power-up conditions for state machines, latches, etc., save for one difference: Nothing happens to change the values or condition of addressable register or counter 13.

The apparatus and method described above need not be limited to a two-page system that allows a single instance of updating. PROM 3 could have several pages. To accommodate this the number of MSB's would need to be increased. For example, for up to three replacement pages of an original (for a total of four pages) there would need to be two MSB's. Three MSB's would allow up to seven replacement pages. To provide more MSB's for addressing the PROM, PAGE bit 13 needs to be replaced either by a wider field of bits or by a counter. If it is replaced by a wider field of bits that receive their value from some process in the code being executed on the page about to be "flushed," then the order in which pages are used can be arbitrary, which might meet some special need. If a counter is used, then the order of page consumption during page switching follows the natural one produced by the decoding of the count sequence of the counter. Another adjustment involves one-shot 16. It would be triggered either by a write operation to an enlarged field of bits or by the increment command to a counter. Either way is easier (and probably preferable) to detecting that one or more of the output MSB's has changed, although some slight delay may be needed either in triggering the one-shot or in allowing its output to create the RESET applied to micro-controller 2. This delay would be needed to ensure that the new value of the enlarged field of bits actually and safely gets into those bits before RESET causes the micro-controller to lose its mind, so to speak. It wouldn't do, for example, for the tail end of a write operation to the enlarged field of bits to be impolitely terminated before its natural conclusion.

If a counter is used, then the pseudo code for the page switching portion of the initialization routines would need to be adjusted to be something equivalent to the following:

```
PROCEDURE COUNT_TO_LATEST_PAGE
    BEGIN
        IF PROM_GNP_BIT = UNPROGPRAMMED
        {is the present page unsuperseded?}
            THEN ... <INITIALIZE TO COMPLETION
            AND RUN>
        ELSE
        TEMP := RAM_PAGE_COUNT
        INCREMENT (RAM_PAGE_COUNT) { e.g., a
        write operation to a selected address could get turned
        into a increment instruction to the counter}
    END
```

The read, addition by one and assignment operations concerning TEMP (which are equivalent to RAM_PAGE_BIT:=RAM_PAGE_BIT+1) assume that a write operation to the field of MSB bits triggers a delayed RESET to the micro-controller 2. Another way to do what is needed is let the enlarged field of MSB bits be the output of a counter. To do it that way, some means must be provided so that the execution of some action in an initialization routine being executed from PROM gets turned into an increment instruction for that counter. That is easily enough done, for example, by decoding a write operation to a selected address in RAM.

Now consider the mode where addressable register 12 remains a register instead of becoming a counter. As before RAM_PAGE_BIT 13 expands to become RAM_PAGE_BITS 13, where the number of bits is adequate to address the number of pages contemplated. Also as before, these bits are set to some predetermined and known-in-advance value upon turn-on; all zeros is as good a value as any. Since there is not a counter to be incremented, another way must be used to produce the next page number. There are at least two ways this can be done. First, the existing page number in RAM_PAGE_BITS can be read, incremented and stored back into RAM_PAGE_BITS by suitable initialization routine code executed by the micro-controller 2. The store operation would produce the input to OR gate 15 needed for causing a reset of the micro-controller 2. Second, a bit-pattern written in the page about to be superseded can serve as the address of the page that contains the replacement version. The bit-pattern would remain unprogrammed until such time as the replacement is itself programmed; they would both be programmed at the same time. The bit-patten can either be a word or byte by itself, separate from the PROM_GNP_BIT or flag. Alternatively, the PROM_GNP_BIT can become PROM_GNP_BITS with the rule that a non-programmed value (of which there is only one, and which is typically all ones) represents a cleared flag (this page is not replaced) and any programmed value represents the address of the replacement page. With the technique of encoding the address of the replacement page on its predecessor there can be an arbitrary order for the consumption or use of replacement page addresses.

Naturally, these alternative techniques each require some corresponding alteration to the pseudo code:

```
PROCEDURE COMPUTE_NEXT_PAGE
    BEGIN
        IF PROM_GNP_BIT = UNPROGRAMMED {is the
        present page unsuperseded?}
            THEN ... <INITIALIZE TO COMPLETION
            AND RUN>
        ELSE
            TEMP := RAM_PAGE_BITS
            RAM_PAGE_BITS := TEMP + 1 {selects next page,
            write operation resets micro-controller}
    END
```

```
PROCEDURE TRAVERSE_TO_NEXT_PAGE
    BEGIN
        IF PROM_GNP_BIT = UNPROGRAMMED {is the
        present page unsuperseded?}
            THEN ... <INITIALIZE TO COMPLETION
            AND RUN>
        ELSE
            TEMP := NEW_PAGE_ADDRESS
            {NEW_PAGE_ADDRESS could be
            PROM_GNP_BITS or a separate location left
            unprogrammed until a revision occurs}
            RAM_PAGE_BITS := TEMP {selects next page,
            write operation resets micro-controller}
    END
```

The astute observer will agree that NEW_PAGE_ADDRESS and PROM_GNP_BITS could be the same location. The idea is to let a (unique) unprogrammed value in that location serve as the flag that there is no revision page, while any programmed value serves both as the flag that there is a revision as well as what its page number is.

We claim:

1. Apparatus for executing a more recently installed version of an embedded firmware system, the apparatus comprising:

processor means for executing embedded firmware system code and responsive to a processor reset signal by commencing execution from a start address;

memory means addressable by contiguous least significant bits defining an address space and originating at the processor means and also addressable by a most significant bit, the address space defined by the least significant bits being within one of first and second pages and the most significant bit determining which of the first and second pages is addressed by the least significant bits, the memory means for storing within the first page an initial version of the embedded firmware system and for storing within the second page a more recent version of the embedded firmware system;

the initial and more recent versions of the embedded firmware system each including respective initialization routines beginning at the start address within the page determined by the most significant bit;

the initial version of the embedded firmware system including an addressable flag location therein whose stored content indicates the presence or absence within the second page of the more recent version of the embedded firmware system;

register means for storing, setting and resetting the value of a page selection bit, the register means having an output coupled to the memory means as the most significant bit, and also having set and reset inputs for respectively setting and resetting the value of the page selection bit;

means for generating a power-up signal indicative of an application of power to the apparatus;

means, coupled to the power-up signal and to the reset input of the register means, for resetting the value of the page selection bit upon an application of power to the apparatus;

the initialization routine of the initial version of the embedded firmware system including a determination of the value of the flag location subsequent to which no setting of the page selection bit occurs if the flag location indicates that no more recent version of the embedded firmware system exists within the second page, and subsequent to which a setting of the page selection bit does occur if the flag location does so indicate; and means coupled to the register means and to the power-up signal for issuing the processor reset signal upon either an instance of the power-up signal or a setting of the page selection bit.

2. Apparatus as in claim 1 wherein the initialization routine of the more recent version of the embedded firmware system includes a determination of the value of the page selection bit, made prior to the determination of the flag location, subsequent to which prior determination the page selection bit is left unaltered, no processor reset signal is issued, and the more recent version of the embedded firmware system is commenced by its initialization routine, if the prior determination is that the page selection bit is set.

3. Apparatus as in claim 1 wherein the memory means comprises programmable read only memories.

4. Apparatus for executing a most recently installed version of an embedded firmware system, the apparatus comprising:

processor means for executing embedded firmware system code and responsive to a processor reset signal by commencing execution from a start address;

memory means addressable by contiguous least significant bits defining an address space and originating at the processor means and also addressable by contiguous most significant bits, the address space defined by the least significant bits being within one of a plurality of pages and the most significant bits determining which page of the plurality of pages is addressed by the least significant bits, the memory means for storing within a first page an initial version of the embedded firmware system and for storing within second and subsequent pages respectively more recent versions of the embedded firmware system, the first page corresponding to an initial pattern of most significant bits and the second and subsequent pages corresponding respectively to successive increments of the initial pattern of most significant bits;

the initial, second and more recent versions of the embedded firmware system each including respective initialization routines beginning at the start address within the page determined by the most significant bits, and each also including an addressable flag location whose stored content indicates the presence or absence within the following page of a more recent version of the embedded firmware system;

register means for storing, incrementing and resetting a page selection pattern, the register means having an output coupled to the memory means as the most significant bits, and also having increment and reset inputs for respectively incrementing and resetting to the initial pattern thereof the page selection pattern;

means for generating a power-up signal indicative of an application of power to the apparatus;

means, coupled to the power-up signal and to the reset input of the register means, for resetting the value of the page selection pattern upon an application of power to the apparatus;

each version of the embedded firmware system including a determination of the value of its flag location subsequent to which no incrementing of the page selection pattern occurs if that flag location indicates that no more recent version of the embedded firmware system exists within a following page and subsequent to which an increment of the page selection pattern does occur if that flag location does so indicate; and means coupled to the register means and to the power-up signal for issuing the processor reset signal upon either an instance of the power-up signal or a increment of the page selection pattern.

5. A method of revising an apparatus' embedded system whose code is fetched from PROM and executed by a processor, the method comprising the steps of:

a. addressing the PROM as an ordered series of pages, each page corresponding to the address space of the processor, and page selection accomplished by one or more address bits that originate from a page selection circuit and that are more significant than those from the processor;

b. storing an initial version of the embedded system in the first page of the ordered series thereof, the initial version including within its page an initialization routine whose starting address is that at which the processor begins execution subsequent to a reset applied to the processor and also including within its page a logical value of CLEAR in a revision flag whose meaning when having a logical value of SET, is that a revised version of the embedded system exists in the next page in the ordered series thereof;

c. causing, upon the application of power to the apparatus, the page selection circuit to select the first page in the ordered series thereof;

d. issuing, upon the application of power to the apparatus, a reset signal to the processor, causing the processor to begin executing the initialization routine of the initial version;

e. interrogating, as part of the initialization routine being executed, the revision flag included within the page presently selected by the page selection circuit;

f. if the revision flag interrogated in step (e) has a logical value of CLEAR, then executing the embedded system stored on the page presently selected by the page selection circuit; and g. if the revision flag interrogated in step (e) has a logical value of SET, then:

h. incrementing the pattern of the more significant address bits that originate from the page selection circuit; and then i. issuing a reset signal to the processor, whereby steps (e) through (g) are repeated.

6. A method as in claim 5 further comprising the steps of:

j. storing a revised version of the embedded system within the first unused page in the ordered series of pages, the revised version including within its page an initialization routine whose starting address is that at which the processor begins execution subsequent to a reset applied to the processor and also including within its page a logical value of CLEAR in a revision flag whose meaning, when having a logical value of SET, is that a revised version of the embedded system exists in the next page in the ordered series of pages; and k. setting the logical value of the revision flag in the page preceding that first unused page to SET.

7. A method of revising an apparatus' embedded system whose code is fetched from PROM and executed by a processor, the method comprising the steps of:

a. addressing the PROM as an ordered series of pages, each page corresponding to the address space of the processor, and page selection accomplished by one or more address bits that originate from a page selection circuit and that are more significant than those from the processor;

b. storing an initial version of the embedded system in the first page of the ordered series thereof, the initial version including within its page an initialization routine whose starting address is that at which the processor begins execution subsequent to a reset applied to the processor and also including within its page a logical value of CLEAR in a revision flag whose meaning when having a logical value of SET is that a revised version of the embedded system exists in the next page in the ordered series thereof, and additionally including within its page a stored page number identifying which page in the ordered series thereof will contain a revised version of the embedded firmware system that is to be executed in place of the initial version;

c. causing, upon the application of power to the apparatus, the page selection circuit to select the first page in the ordered series thereof;

d. issuing, upon the application of power to the apparatus, a reset signal to the processor, causing the processor to begin executing the initialization routine of the initial version;

e. interrogating, as part of the initialization routine being executed, the revision flag included within the page presently selected by the page selection circuit;

f. if the revision flag interrogated in step (e) has a logical value of CLEAR, then executing the embedded system stored on the page presently selected by the page selection circuit; and g. if the revision flag interrogated in step (e) has a logical value of SET, then:

h. reading the stored page number;

i. setting the pattern of the more significant address bits that originate from the page selection circuit to be the same as the stored page number read in step (i); and then j. issuing a reset signal to the processor, whereby steps (e) through (g) are repeated.

8. A method as in claim 5 further comprising the steps of:

k. storing a revised version of the embedded system within the unused page in the ordered series of pages corresponding to stored page number, the revised version including within its page an initialization routine whose starting address is that at which the processor begins execution subsequent to a reset applied to the processor and also including within its page a logical value of CLEAR in a revision flag whose meaning when having a logical value of SET is that a revised version of the embedded system exists in the next page in the ordered series of pages, and additionally including within its page a stored page number identifying which page in the ordered series thereof is to contain a further revised version of the embedded firmware system; and l. setting the logical value of the revision flag in the page preceding that first unused page to SET.

9. A method as in claim 7 wherein within each page the revision flag and the stored page number are stored in the same location and further comprising the step of indicating a logical value of CLEAR for the revision flag by the presence of an unprogrammed value in that same location and a logical value of SET with any programmed value that also identifies a page number.

\* \* \* \* \*